United States Patent [19]

Lindskog

[11] Patent Number: 4,571,843
[45] Date of Patent: Feb. 25, 1986

[54] DEVICE FOR PREVENTING ERROR IN A COMPASS

[75] Inventor: Clas G. Lindskog, Sollentuna, Sweden

[73] Assignee: Instrumentverken Aktiebolag, Sollentuna, Sweden

[21] Appl. No.: 647,421

[22] Filed: Sep. 5, 1984

[30] Foreign Application Priority Data

Sep. 9, 1983 [SE] Sweden ............................ 8304852

[51] Int. Cl.⁴ ........................ G01C 9/00; G01C 17/02
[52] U.S. Cl. .................................... 33/355 R; 33/349
[58] Field of Search ................ 33/355, 356, 359, 352, 33/364, 319, 346, 357

[56] References Cited

U.S. PATENT DOCUMENTS

| | | | |
|---|---|---|---|
| 163,838 | 6/1975 | Baker | 33/355 |
| 1,023,858 | 4/1912 | Laures | 33/352 |
| 1,270,178 | 6/1918 | Lehtinen | 33/355 X |

FOREIGN PATENT DOCUMENTS 147305 7/1920 United Kingdom ................ 33/397

OTHER PUBLICATIONS

Silva Sweden AB, "Silva Marine Modern Navigation Instruments for all Types of Boats", p. 3.
Silva Sweden AB, "Silva Marine Compasses", p. 4.

Primary Examiner—Harry N. Haroian
Attorney, Agent, or Firm—Stevens, Davis, Miller & Mosher

[57] ABSTRACT

A device for preventing error or misreading in a marine compass fastened to a sloping plane, the compass being provided with a pendulum (9) mounted for limited pivoting movement inside its spherical casing (1), the pendulum having rotatably and pivotably mounted on it a compass disk (16) with a scale (18), which is intended to be read against a co-called steering line (12) on the pendulum (9) at an angle of 0° to about 45° relative the horizontal plane. The pendulum is pivotably mounted in a cradle (5) pivotably mounted inside the compass casing (1) for movement relative the casing in two planes substantially at right angles to each other so that its steering line (12) and the mounting point (c) of the compass disk (16) are continuously maintained by the action of gravity in the same vertical plane relative the fore-and-aft line of the boat independent of heeling of the boat.

2 Claims, 6 Drawing Figures

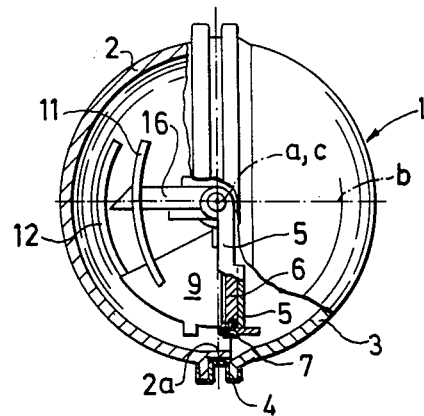
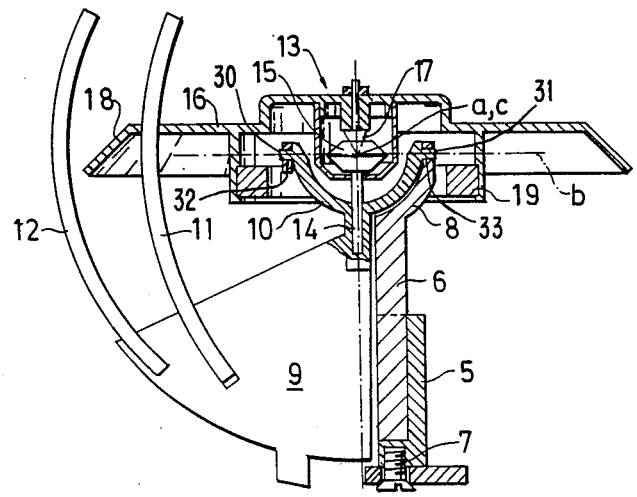
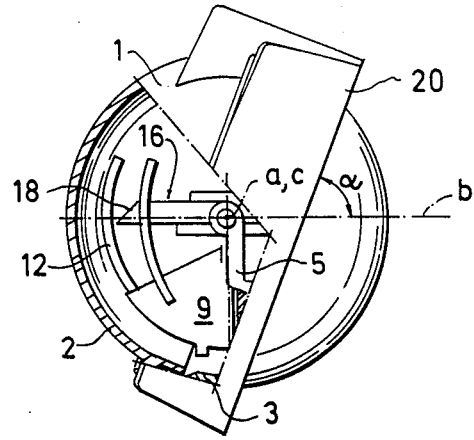

DEVICE FOR PREVENTING ERROR IN A COMPASS

BACKGROUND OF THE INVENTION

1. Field of the Invention

The present invention relates to a device for preventing error or misreading in a marine compass fastened to a sloping surface, the compass being provided with a pendulum (9) mounted for limited pivoting movement inside its spherical casing (1), the pendulum having rotatably and pivotably mounted on it a compass disk (16) wich a scale (18), which is intended to be read against a so-called steering line (12) on the pendulum (9) at an angle of 0° to about 45° relative the horizontal plane.

2. Description of the Prior Art

Marine compasses which include a pendulum provided with steering lines, the pendulum being pivotably mounted in the spherical casing and having pivotably and rotatably mounted on it a compass disk provided with a scale, intended to be read against the steering lines, are already known, e.g. from the marine compass type K-121 marketed by SILVA, Sweden AB, Sollentuna, Sweden.

Each of these known compasses is intended for mounting on a vertical bulkhead in a boat for reading from the side, and if this is done the observer should be able to read correct values on the scale, independent of the heeling of the boat. However, if the compass is mounted on a bulkhead sloping forwards or backwards relative the fore-and-aft line (which many bulkheads do) and adapter blocks are not used to ensure that the compass assumes a vertical position when it is fitted, incorrect values will be read from the scale as soon as the boat heels (rolls) a small amount, which is due to the axis about which the pendulum swings being displaced from the point about which the compass disk is pivotably and rotatably mounted on the pendulum.

To remedy this problem it is of course possible to select a compass which has full gimbal suspension of the device carrying the compass disk, but such a compass cannot be used if it is to be observed from the side (at an angle of 0°-45° relative the horizontal plane) since at least one of the gimbal rings, irrespective of whether it is placed inside or outside compass casing, and irrespective of how the compass is fitted and how much the boat heels, will always be situated between the observer and the scale of the compass disk, which makes correct reading of the scale more difficult, and sometimes impossible.

DISCLOSURE OF THE INVENTION

It is an object of the present invention to obviate the disadvantages which previously known compasses, and to provide a compass of the kind described in the introduction which is simply constructed and reliable and which, even if it is not fitted vertically in the boat, gives correct and easily read values substantially independent of the size of the heeling movement of the boat.

This object is achieved by the compass in accordance with the invention being given the distinguishing features disclosed in the characterizing portions of the claims.

BRIEF DESCRIPTION OF THE FIGURES

FIG. 1 is a partially cut-away side view of a compass casing including the device in accordance with the invention, FIG. 2 is a cut-away side view of parts in the compass casing according to FIG. 1 but to a larger scale, FIG. 2 being seen from the same direction as FIG. 1, FIG. 3 is a partially cut-away side view of the compass casing according to FIG. 1, included in a compass fitted to a sloping bulkhead.

DETAILED DESCRIPTION OF THE PREFERRED EMBODIMENT

Figure 4:
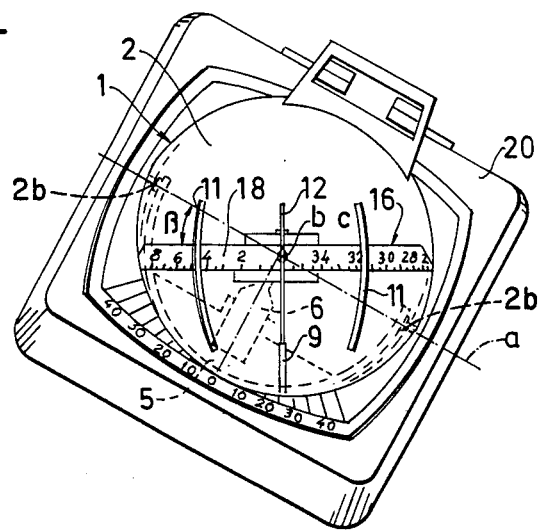
FIG. 4 is a view from the front of the compass according to FIG. 3, fitted in the same way as in FIG. 3, but in a heeling boat.

In FIGS. 1 and 4 there is illustrated a compass casing 1 comprising of two hemispherical cupolas 2 and 3 sealingly joined together along their circumferential edges with the aid of a fastening means 4. At two diametrically opposing points inside the casing 1, a semicircular cradle 5 is pivotably mounted on the inner circumferential edge 2a of the cupola 2 at points 26. The cradle 5 is pivotable around an axis a, and by the action of gravity strives to assume the plumb position illustrated in FIG. 1, independent of the compass direction.

An upwardly directed guide pillar 6, with its upper part formed as a fork 8, is screwed at 7 centrally to the cradle 5, as illustrated in FIGS. 1 and 2, the upper bowl-shaped part 10 of a pendulum 9 has trunnions 30 and 31 mounted in the bearings 32 and 33 of fork 8 for a maximum pivoting movement of about ±45° relative the cradle 5 about an axis b at right angles to the axis a about which the cradle is pivotable.

The pendulum 9 is provided with three steering lines, 11, 12, one (12) of which is situated centrallv on the pendulum. At the upper part 10 of the pendulum 9 a conventional compass disk unit 13 is mounted, this unit including a shaft 14 fastened to the part 10 and having a mounting 15 in which a downwardly projecting tip 17 from a compass disk 16 rests. The compass disk 16 is provided with a scale 18 going all the way round its circumferance, as well as stabilizing and magnetic means 19. The tip 17 and mounting 15 allow the disk 16 to be pivoted approximately ±30° relative the pendulum in the vertical plane about the point c and also to be rotated ±360° relative the pendulum in the horizontal plane.

The function of the described device will now be described, it being assumed that the housing 20, surrounding and fastened to compass casing 1, is fitted as illustrated in FIG. 3, i.e. so that the housing and thereby the casing forms an angle with the horizontal plane deviating from 90°, and inclines forward in the fore-and-aft line of the boat. In this position the cradle 5 still assumes a vertical attitude due to its being pivotable about the axis a, whereby the axis b is retained in the horizontal plane. The pendulum 9 is retained in an unaltered attitude with the axis a and the compass disk 16 still horizontal.

When the boat heels or rolls about the fore-and aft line a given angle relative the horizontal plane, the compass (1, 20) will assume the attitude illustrated in FIG. 4, the axis a being turned a corresponding angle, while the pendulum 9 is retained in the vertical plane due to its being pivotable about the axis b. When the compass is to be read, an observer reading the scale 18 against the steering line 12, i.e. he looks at the compass in the plane of the paper in FIG. 4, will obtain a correct reading value due to the axis b being still horizontal and coinciding with the point c about which the compass disk 16 is pivotably and rotatably mounted relative the pendulum 9.

Figure 5:
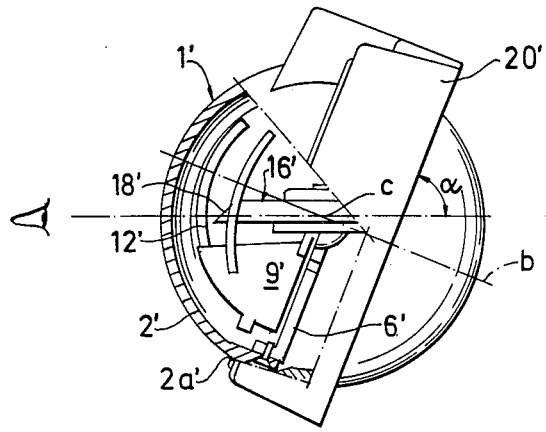
FIG. 5 is a partially cut-away side view of a known compass fitted in the same way as the compass according to FIG. 3.
Figure 6:
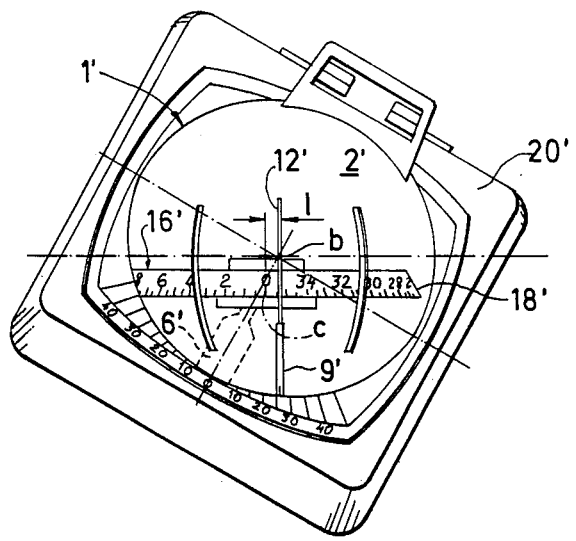
FIG. 6 is a view seen from the front of the compass according to FIG. 5, fitted, and with the boat heeling in the same way, as the compass according to FIG. 4.

For more clearly illustrating the advantages of the present invention in relation to the prior art, a known compass is illustrated in FIGS. 5 and 6, an incorrect value being read off from it when the boat in which it is fitted, so that it inclines forward in the fore-and-aft direction, heels about this line. Parts in FIGS. 5 and 6 corresponding to parts in FIGS. 1-4 have the same reference characters as these, with the addition of a prim sign.

The compass illustrated in FIGS. 5 and 6 is generally in agreement with the one illustrated in FIGS. 1-4, but with the essential difference that the cradle 5 is lacking in the compass according to FIGS. 5 and 6, and that a guide pillar 6' corresponding to the guide pillar 6 is screwed to the circumferential edge 2a' of the cupola 2' without the possibility of being able to be displaced relative the casing 1' and housing 20'.

When the compass 1', 20' assumes the inclined attitude ($\alpha$) illustrated in FIG. 5, and the boat is not heeling about the fore-and-aft line, a correct reading of the scale 18' is obtained against the steering line 12'.

When the boat heels about the fore-and-aft line (as illustrated in FIG. 6) the pendulum 9' does indeed remain in a vertical position seen in the direction of the fore-and-aft line, since it is pivotable about the axis b, but since the pendulum is not pivotable at right angles to this axis and the axis b thus forms an angle ($90 - \alpha$) to the horizontal plane, the axis b and point c will be displaced away from each other in the horizontal plane when the boat heels, resulting in that the observer reads off a scale value against the steering line 12' which is situated at a distance from the correct value. This incorrect value, i.e. the mentioned distance or error, increases with increasing heeling and with increasingly inclined fitting of the compass to the bulkhead ($\alpha$ decreases). In a typical case where the angle $\alpha = 80°$ and heeling = 30°, the error can reach 5°.

It should have been apparent that by the embodiment of the invention described above and illustrated on the drawings, error or misreading of compasses of the kind in question is prevented. The invention is however not limited to this embodiment, but only by the disclosures in the claims.

I claim:

1. A compass for preventing error or misreading fastened to a sloping plane of a boat, the compass comprising a spherical casing, a pendulum mounted for limited pivoting movement in a first plane inside said casing, a sealed compass disk having a mounting point rotatably and pivotally mounted on said pendulum, a steering line on said pendulum, said sealed disk being intended to be read at an angle of 0° to about 45° relative to a horizontal plane, a cradle pivotably mounted inside and to the spherical casing for movement relative the spherical casing in a second plane substantially at right angles to said first plane, said pendulum being mounted in said cradle for pivoting movement thereon in said first plane, the steering line of the pendulum and said mounting point for said disk on the pendulum being continuously maintained by the action of gravity in the same vertical plane relative the fore-and-aft line of the boat independent of the heeling of the boat.

2. Device as claimed in claim 1 wherein said cradle is pivotable on the compass casing about an axis (a) normally in a horizontal plane and passing through the center of the compass casing, the cradle being provided at its center with an upwardly projecting guide pillar, at the upper end of which the pendulum is rotatably mounted about an axis (b) continuously at right angles to said axis (a).

* * * * *